US009043706B2

(12) United States Patent
Nancke-Krogh

(10) Patent No.: US 9,043,706 B2
(45) Date of Patent: May 26, 2015

(54) SYSTEM AND METHOD FOR USING STATE REPLICATION BETWEEN APPLICATION INSTANCES TO PROVIDE A COLLABORATIVE DESKTOP ENVIRONMENT

(76) Inventor: Anders Nancke-Krogh, San Francisco, CA (US)

(*) Notice: Subject to any disclaimer, the term of this patent is extended or adjusted under 35 U.S.C. 154(b) by 0 days.

(21) Appl. No.: 13/213,025

(22) Filed: Aug. 18, 2011

(65) Prior Publication Data

US 2012/0054640 A1 Mar. 1, 2012

Related U.S. Application Data

(60) Provisional application No. 61/402,477, filed on Aug. 31, 2010.

(51) Int. Cl.
| | |
|---|---|
| G06F 3/00 | (2006.01) |
| G06F 15/16 | (2006.01) |
| G06F 9/44 | (2006.01) |
| G06F 9/48 | (2006.01) |
| G06F 3/14 | (2006.01) |
| G06F 9/54 | (2006.01) |
| H04L 29/08 | (2006.01) |

(52) U.S. Cl.
CPC ............... *G06F 9/4843* (2013.01); *H04L 67/10* (2013.01); *G06F 3/1454* (2013.01); *G06F 9/54* (2013.01)

(58) Field of Classification Search
CPC ....... G06F 9/4843; G06F 9/54; G06F 3/1454; H04L 67/10
USPC ............................. 715/751; 709/231; 717/177
See application file for complete search history.

(56) References Cited

U.S. PATENT DOCUMENTS

| 5,157,381 A | 10/1992 | Cheng |
| 5,379,374 A | 1/1995 | Ishizaki et al. |

(Continued)

FOREIGN PATENT DOCUMENTS

| WO | WO 97/04383 | 2/1997 |
| WO | WO 97/04383 A1 | 2/1997 |

OTHER PUBLICATIONS

International Search Report and Written Opinion in PCT/US11/048476, dated Jan. 5, 2012.

(Continued)

*Primary Examiner* — Jennifer To
*Assistant Examiner* — Li Sun
(74) *Attorney, Agent, or Firm* — Thrasher Associates

(57) ABSTRACT

Described herein are systems and methods for enabling a collaborative remote desktop environment. The system includes a computing device and a first application instance that has an application state associated therewith. The first application instance includes, or is associated with, a current state component and application data/data files. The system further includes an application launcher that is used to instantiate a second application instance operating either on the same or on a different computing device. The second application instance similarly has an application state associated therewith and is associated with the application launcher. Upon receiving a request from the second user to interact with the first application instance, the application state and the application data/data files are communicated to the application launcher, and the application launcher instantiates the second application instance so that its state is substantially identical to that of the first application instance.

28 Claims, 12 Drawing Sheets

(56) References Cited

U.S. PATENT DOCUMENTS

| | | | |
|---|---|---|---|
| 5,845,282 | A | 12/1998 | Alley et al. |
| 5,923,307 | A | 7/1999 | Hogle, IV |
| 5,949,975 | A | 9/1999 | Batty et al. |
| 6,437,803 | B1 | 8/2002 | Panasyuk et al. |
| 6,463,459 | B1 | 10/2002 | Orr et al. |
| 6,615,253 | B1 | 9/2003 | Bowman-Amuah |
| 6,680,714 | B2 | 1/2004 | Wilmore |
| 6,694,335 | B1 * | 2/2004 | Hopmann et al. ............ 707/624 |
| 6,963,908 | B1 | 11/2005 | Lynch et al. |
| 7,519,910 | B2 | 4/2009 | Saka |
| 7,660,799 | B2 | 2/2010 | Saigo et al. |
| 8,010,901 | B1 | 8/2011 | Rogers |
| 8,015,496 | B1 | 9/2011 | Rogers |
| 2002/0033839 | A1 | 3/2002 | Elber |
| 2003/0015632 | A1 | 1/2003 | Dunn |
| 2003/0145056 | A1 * | 7/2003 | Fujisawa et al. ............. 709/205 |
| 2005/0080915 | A1 * | 4/2005 | Shoemaker et al. .......... 709/231 |
| 2005/0086612 | A1 | 4/2005 | Gettman |
| 2005/0120349 | A1 | 6/2005 | Wright |
| 2006/0284785 | A1 | 12/2006 | Bitterlich |
| 2007/0055941 | A1 | 3/2007 | Bhakta et al. |
| 2007/0192329 | A1 | 8/2007 | Croft |
| 2008/0046828 | A1 * | 2/2008 | Bibliowicz et al. ........... 715/751 |
| 2008/0148184 | A1 | 6/2008 | Davis |
| 2009/0006553 | A1 | 1/2009 | Grandhi |
| 2009/0112990 | A1 * | 4/2009 | Campbell et al. ............. 709/205 |
| 2009/0234983 | A1 | 9/2009 | Golden et al. |
| 2009/0248783 | A1 | 10/2009 | Amano |
| 2009/0276771 | A1 | 11/2009 | Nickolov et al. |
| 2010/0128423 | A1 | 5/2010 | Moscovitch |
| 2011/0063191 | A1 | 3/2011 | Leung |
| 2011/0164065 | A1 | 7/2011 | Mate |
| 2011/0197147 | A1 | 8/2011 | Fai |
| 2011/0202834 | A1 | 8/2011 | Mandryk |
| 2011/0307788 | A1 * | 12/2011 | Cheung et al. ................ 715/731 |
| 2012/0054640 | A1 | 3/2012 | Nancke-Krogh |
| 2013/0067396 | A1 | 3/2013 | Demopoulos |

OTHER PUBLICATIONS

International Searching Authority, International Search Report and Written Opinion for PCT/US2013/024964, Jun. 15, 2013, 8 pages.

International Searching Authority, International Search Report and Written Opinion for PCT/US2013/038916, Oct. 29, 2013, 15 pages.

Unknown Author, Fvwm 2.6.0 Man Page. Instruction manual [online], Apr. 15, 2011, retrieved from the Internet: http://www.fvwm.org/documentation/manpages/unstable/fvwm.php.

Unknown Author, Wraparound for Mac. Software review [online], Dec. 29, 2011, retrieved from the Internet: http://web.archive.org/web/20111229133659/http://download.cnet.com/Wraparound/3000-18487_4_32085.html.

"European Search Report and Search Opinion," issued in European Patent Application No. 11822358, mailed on Jan. 8, 2014, 7 pages.

\* cited by examiner

SYSTEM AND METHOD FOR USING STATE REPLICATION BETWEEN APPLICATION INSTANCES TO PROVIDE A COLLABORATIVE DESKTOP ENVIRONMENT

CLAIM OF PRIORITY

This application claims the benefit of priority to U.S. Provisional Patent Application titled "SYSTEM AND MACHINE FOR A COLLABORATIVE REMOTE DESKTOP ENVIRONMENT"; Application No. 61/402,477; filed Aug. 31, 2010, which is incorporated by reference herein.

FIELD OF INVENTION

Embodiments of the present invention are generally related to computer systems, and user-computer interaction and collaboration, and are particularly related to systems and methods for enabling a collaborative desktop environment in a computer, media, or other environment.

BACKGROUND

A remote desktop system generally allows a user at a client device (i.e., a remote user) to view an information display or desktop of another user's device (i.e., a host user). The technology behind many of today's remote desktop systems consists of presenting a live feed of one user's information display or desktop to one or more other users' information display or desktop, and to allow the other users to interact with an application at the host user's device through a remote desktop window. Such systems are convenient and cost effective for allowing a remote user to, e.g., help a user at a host device with administration of the host user's device. For example, the remote desktop system can render the host user's information display on the remote user's display device as a remote desktop window, so that any interactions made by either the remote user or the host user is executed by the applications running on the host user's computer.

Remote desktop systems have also been used in net-meeting or presentation-like environments. In such environments, a user at a host device can present information about an application at the host device to remote users, while simultaneously restricting the remote users from interacting with the host application. Variations of such systems allow the host user to control which, if any, of the remote users can control and/or interact with the host application. Additionally, some remote desktop systems allow multiple remote users to connect with and share control of a host application.

However, to date, many remote desktop systems have focused on applications running only on the host user's device, and provide little in the area of collaboration. For example, where an application is running on a host user's device, any interaction made by a remote user through the remote desktop system will affect all of the other users viewing that host application. This is particularly unsatisfactory in applications such as web browsing, where, e.g., a host user may retrieve a web page, and when the host user has finished reading the web page, the host user will navigate to another page by selecting a hyperlink. Remote users, who may be viewing the same web page through a remote desktop window, may be reading slower or faster than the host user. Those remote users who finish reading will be required to wait for the host user, but might want to explore the content behind one of the hyperlinks on the page. However, if a client user remotely interacting with the host application selects a link (assuming the host user has granted them permission to interact with the host's web browser), then the host application will navigate to this new link and the host user will be interrupted, as will any other remote readers who have not finished reading the content. Alternatively, if the host user decides not to share control of their browser application, the host user might be asked to copy the uniform resource locator (URL), and send it (e.g., via email or instant message) to the remote users, so that the requesting remote user can perform their own simultaneous browsing while keeping the shared desktop window open. This will similarly interrupt the host user, and delay things for all of the users. These are the general areas that embodiments of the invention are intended to address.

SUMMARY

Described herein are systems and methods for enabling a collaborative remote desktop environment. In accordance with an embodiment, the system includes a computing device and a first application instance (e.g., a web browser or other application) that has an application state associated therewith. The first application instance includes, or is associated with, an input handler, an application logic component, an output handler, a current state component, and application data/data files. When a second user interacts with the first application instance, requests (e.g., interaction requests) from the second user are received at an operating system remote input handler at the computing device. The operating system remote input handler communicates the interaction requests to the current state component; the current state component communicates the application state and the application data/data files to the operating system remote input handler. In accordance with an embodiment, the system further includes an application launcher designated to the second user. The application launcher is used to instantiate a second application instance (e.g., another web browser or another application), operating either on the same or on a different computing device. The second application instance has an application state associated therewith, and similarly includes an input handler, an application logic component, an output handler, a current state component, and application data/data files. The second application instance is associated with the application launcher, wherein the application launcher can receive the application state data and the application data/data files from the first application, via the operating system remote input handler, and instantiates the second application instance so that its state is substantially identical to that of the first application instance. Upon instantiating the second application instance, the original interaction request made by the second user is communicated to the input handler of the second application instance for processing.

For example, in accordance with an embodiment, a first user can use, e.g., a multi-touch enabled desktop computer with a browser window, to browse the web within a browsing session. A second user, who wants to collaborate with the first user, in their own browsing session and starting from a substantially similar position as the first user, can instantiate a new browser window which uses the same uniform resource locator (URL), content, zoom and scroll bar position, etc., as the original browser window, i.e. the new browser window includes substantially the same state as the original browser window and browsing session.

Figure 1:
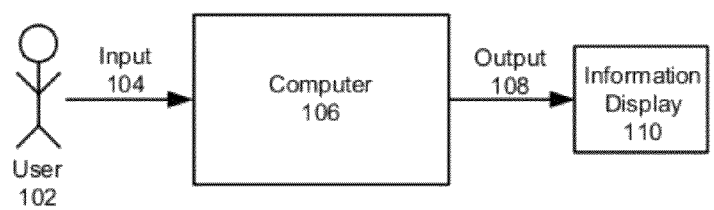
FIG. 1 shows an illustration of a high-level view of a typical computing domain or environment, in accordance with an embodiment.

As described above, the technology behind many of today's remote desktop systems consists of presenting a live feed of one user's information display or desktop to one or more other users' information display or desktop, and to allow the other users to interact with an application at a host user's device through a remote desktop window. Such systems are convenient and cost effective for allowing a remote user to, e.g., help a user at a host device with administration of the host user's device. However, to date, many remote desktop systems have focused on applications running only on the host device, and provide little in the area of collaboration.

To address this, described herein are systems and methods for enabling a collaborative remote desktop environment. In accordance with an embodiment, the system includes a computing device and a first application instance (e.g., a web browser or other application) that has an application state associated therewith. The first application instance includes, or is associated with, an input handler, an application logic component, an output handler, a current state component, and application data/data files. When a second user interacts with the first application instance, requests (e.g., interaction requests) from the second user are received at an operating system remote input handler at the computing device. The operating system remote input handler communicates the interaction requests to the current state component; the current state component communicates the application state and the application data/data files to the operating system remote input handler. In accordance with an embodiment, the system further includes an application launcher designated to the second user. The application launcher is used to instantiate a second application instance (e.g., another web browser or another application), operating either on the same or on a different computing device. The second application instance has an application state associated therewith, and similarly includes an input handler, an application logic component, an output handler, a current state component, and application data/data files. The second application instance is associated with the application launcher, wherein the application launcher can receive the application state data and the application data/data files from the first application, via the operating system remote input handler, and instantiate the second application instance so that its state is substantially identical to that of the first application instance. Upon instantiating the second application instance, the original interaction request made by the second user is communicated to the input handler of the second application instance for processing.

For example, in accordance with an embodiment, a first user can use, e.g., a multi-touch enabled desktop computer with a browser window, to browse the web within a browsing session. A second user, who wants to collaborate with the first user, in their own browsing session and starting from a substantially similar position as the first user, can instantiate a new browser window which uses the same uniform resource locator (URL), content, zoom and scroll bar position, etc., as the original browser window, i.e. the new browser window includes substantially the same state as the original browser window and browsing session.

Glossary Of Terms

In accordance with an embodiment, the following terms are used herein:

An "information display" refers to the visual output of a computer that can be controlled by one or more persons or users, and is sometimes referred to as the "desktop" of the computer. In accordance with an embodiment, the information display can be rendered over one or more physical display devices. In accordance with other embodiments, the information display can be provided such that it covers only a portion of a display device—sometimes referred to as a "split-screen" system.

A "computer" refers to an electronic or computing device that takes input from one user and renders the derived output to an information display. A computer can be implemented as physical hardware or virtual hardware in a physical hardware computing device.

A "computing device" refers to a physical mobile or stationary machine that hosts one or more computers.

A "display device" refers to a physical display that renders the output from one computing device.

A "remote desktop" refers to a system where the information display of a user's computer is rendered in a window on a plurality of other users' information displays.

A "window" refers to a visible output of an application as rendered on an information display. Depending of the capability of the computer used, several windows can be displayed simultaneously on the information display, and the windows can be layered, moved and resized.

An "application" refers to a software program that is previously installed and now executed by a computer. The computer controls which inputs from the user are directed to the application, and the computer controls which outputs the application is allowed to render on the display device. Depending of the capability of the computer, one or several applications can be installed simultaneously and/or running simultaneously.

An "application state" comprises one or more of the application, the content file(s) the application is using and/or writing, and/or all inputs made by the user of this application since the user started using the application for a particular launch of the application (e.g., all input from the opening of the application). In accordance with an embodiment, the application state provided by a first application instance must be adequate and detailed enough to enable another computer or application instance to reach the same (target) application state, or an application state as close as possible or substantially identical, synchronized, or otherwise similar to the target application state.

In accordance with an embodiment, an "msync", sometimes referred to as an "online-media-sync" is the process by which the system enables an application or user to copy the state of an application session (could be a browser) associated with another application or user, so that the user can thereafter continue within their own copy of the application session, starting from a substantially identical, synchronized or otherwise similar position and state, without interrupting the other user.

Introduction

FIG. 1 shows an illustration of a high-level view of a typical computing domain or environment, in accordance with an embodiment. As shown in FIG. 1, the system includes a user 102, a computer 106, and an information display or desktop (e.g., a computer monitor) 110. The user can interact with the computer by providing input 104 to the computer. The various types of input methods that can be used include, but are not limited to, mouse input (e.g., left, right, double clicks using the mouse), touch input (e.g., touch and dragging with one or more fingers at a monitor or touchpad), and keyboard input. The computer receives the input and makes calculations to produce an output 108 (e.g., a visual output, such as a desktop display) based on the input received at the computer and the currently running applications, along with the current state and current files used and/or controlled by the applications. The visual output can be a visual representation that is displayed on the information display.

Figure 2:
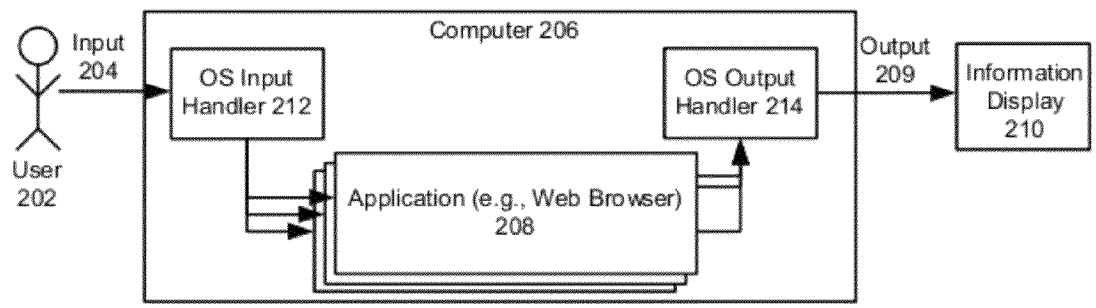
FIG. 2 illustrates a more-detailed view of the computing domain or environment in FIG. 1, including an application and operating system, in accordance with an embodiment.

FIG. 2 illustrates a more-detailed view of the computing domain or environment in FIG. 1, including an application and operating system, in accordance with an embodiment. As shown in FIG. 2, the system includes a user 202, a computer 206, and an information display 210. The computer includes an Operating System (OS) input handler 212, OS output handler 214, and one or more applications. The OS input handler receives input 204 from the user, and forwards that input to an application 208 for further processing. The OS output handler receives the requested visual output from each of the currently running applications on the computer, and determines the portion of the visual output received from each of the applications that will be rendered on the information display. The OS output handler outputs the visual output 209 to the information display. In the event there is more than one visual output from the applications being partly on top of each other, a partial rendering of those visual outputs can be displayed.

Figure 3:
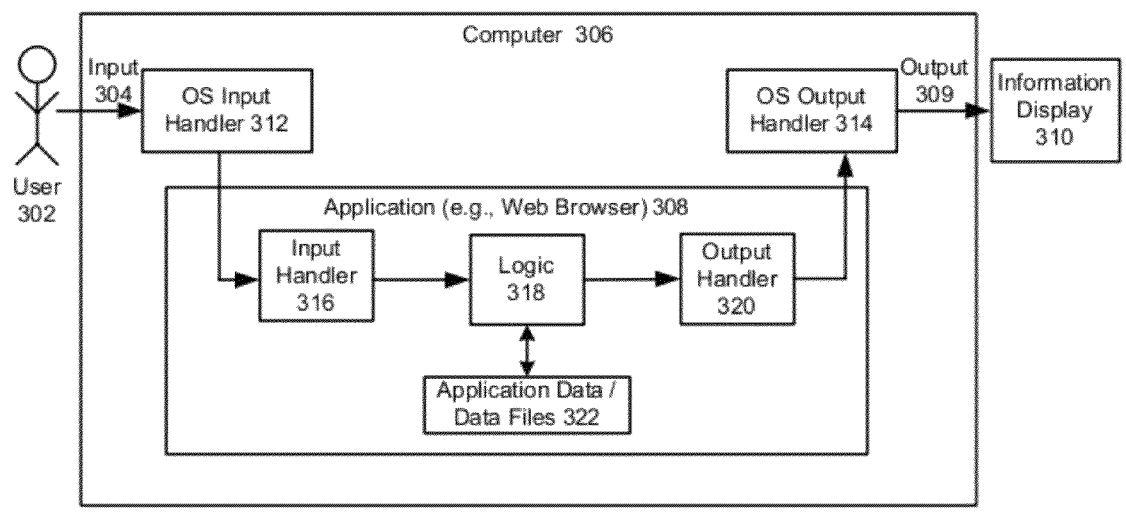
FIG. 3 illustrates a more-detailed view of the computing domain or environment in FIG. 2, including an application input handler, application logic, application output handler, and application data in accordance with an embodiment.

FIG. 3 illustrates a more-detailed view of the computing domain or environment in FIG. 2, including an application input handler, application logic, application output handler, and application data in accordance with an embodiment. As shown in FIG. 3, the system includes a user 302, a computer 306, and an information display 310. An application 308 running on the computer includes an application input handler 316, application logic 318, application output handler 320, and application data/data files 322. Input 304 is received by the application input handler from an OS input handler 312. The application input handler communicates the input to the application logic component, which upon processing the input updates the application state, and the application data/data files used by the application.

In accordance with an embodiment, described in further detail below, the application state must be adequate and detailed enough to enable another computer or application instance to reach the same (target) application state, or an application state as close as possible or substantially identical, synchronized, or otherwise similar to the target application state. To this end, in accordance with an embodiment, the application state can include an application start condition, a data file start condition, and the sequence and timing of all inputs received by the OS input handler. The application converts the current state to a visual output to be displayed on an information display. An OS output handler 314 receives the converted current state from the application output handler, and decides how much of the visual output will be displayed on the information display, where on the information display the visual output will be located, and outputs 309 the visual output to the information display.

Figure 4:
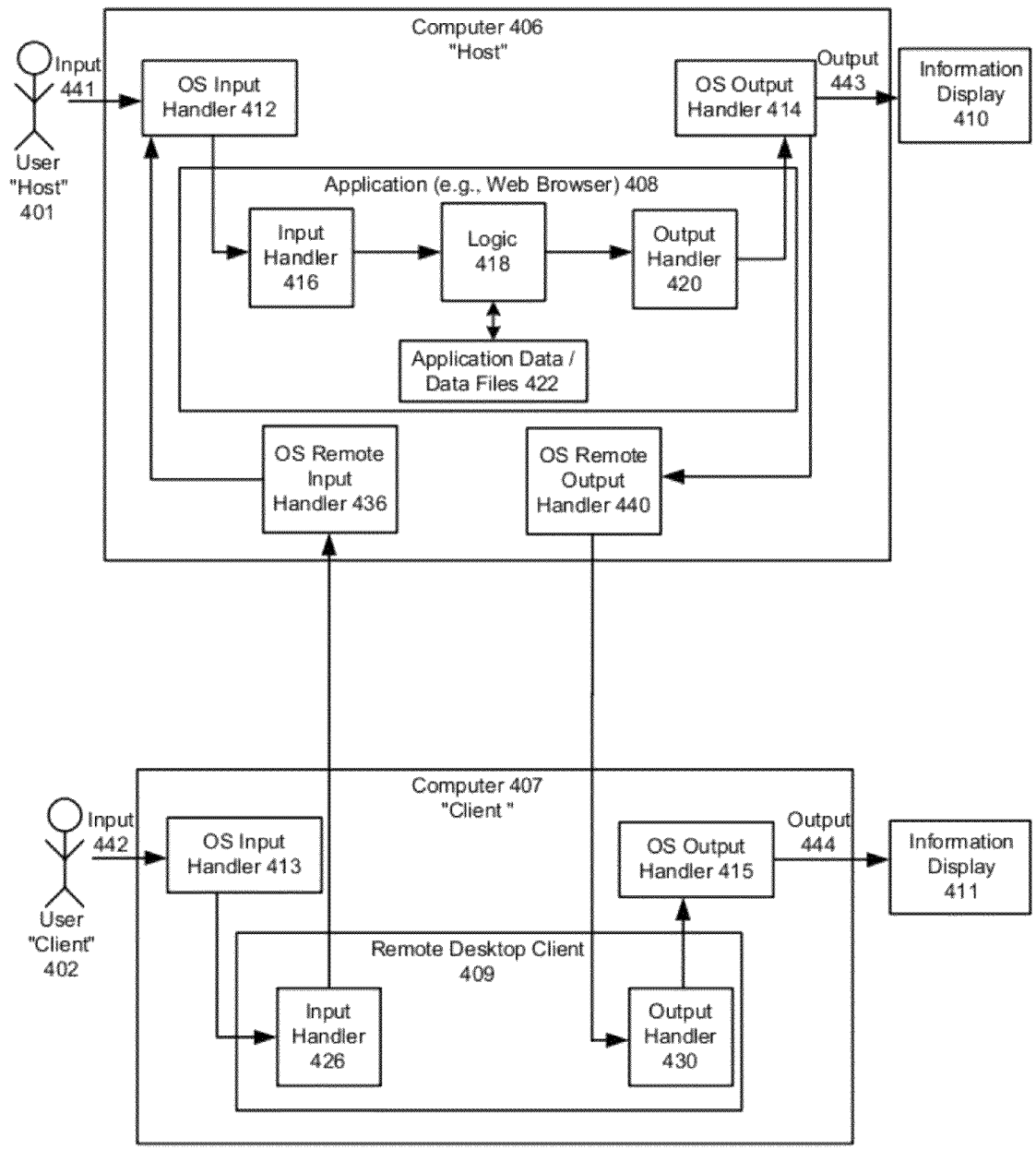
FIG. 4 shows an illustration of how a computing domain or environment can be used to enable a remote desktop system, in accordance with an embodiment.

FIG. 4 shows an illustration of how a computing domain or environment can be used to enable a remote desktop system, in accordance with an embodiment. As shown in FIG. 4, in a "classical" remote desktop environment, a host user 401 can interact with a client user 402 about, e.g., content discovery. The host user can initiate the discovery by starting a first application 408 (e.g., a host application) at a first device 406 (e.g., a host computer). The host application can be, for example, a web browser or another application. The host user can interact with the host application by providing input 441 to the computer. As described above, the various types of input methods that can be used include, but are not limited to, mouse input (e.g., left, right, double clicks using the mouse), touch input (e.g., touch and dragging with one or more fingers at a monitor or touchpad), and keyboard input. The client user creates a remote desktop connection using a remote desktop client application 409 at the client user's computer 407. The host computer initializes an OS remote input handler 436 and an OS remote output handler 440. The OS remote input handler receives input (e.g., a request to interact with the host application) from an input handler 426 at the remote desktop client application, where the input can be from the client user. When the client user interacts with the remote desktop client application, a command to interact 442 (i.e., an interaction command) is received at, then communicated from an OS client input handler 413 to the input handler at the remote desktop client application. The input handler communicates the interaction command to the OS remote input handler on the host computer, which in turn communicates the interaction command to an OS host input handler 412.

The interaction command is treated as though it were sent by the host user. For example, once the interaction command is received by the host application at an input handler 416, the application responds according to the interaction command, not knowing if the input originated from the host or client user. The input handler at the host application communicates the interaction command to an application logic component 418, where the host computer uses data in the application logic component and application data/data files 422 to create a visual output to be displayed on an information display 410 (e.g., a host information display). For example, an OS output handler 414 can receive the visual output from an application output handler 420, and decide how much of the entire window will be displayed and where on the information display the window will be located before outputting 443 the visual output to the information display.

In accordance with an embodiment, the OS output handler communicates the visual display to the OS remote output handler, which in turn communicates the visual output to an output handler 430 at the remote desktop client application. The output handler communicates the visual output to an OS output handler 415 to be communicated 444 to an information display 411 (e.g., client information display). In accordance with an embodiment, the information display renders a window showing a current (e.g., live) representation of the information display of the host user's computer. Inputs received at the host application result in a direct update of the host application and the host user's information display. These updates are communicated from the OS remote output handler to the remote desktop output handler at the remote desktop application, and the client user's information display is updated in real time with the same visual representation as displayed at the host user's information display. The host information display and the client information user display are updated based on the interaction command. For example, the host application is displayed as a window within the host information display, and the viewable area of the host information display is displayed within a window on the client information display.

Two-way Collaborative Sharing

Figure 5:
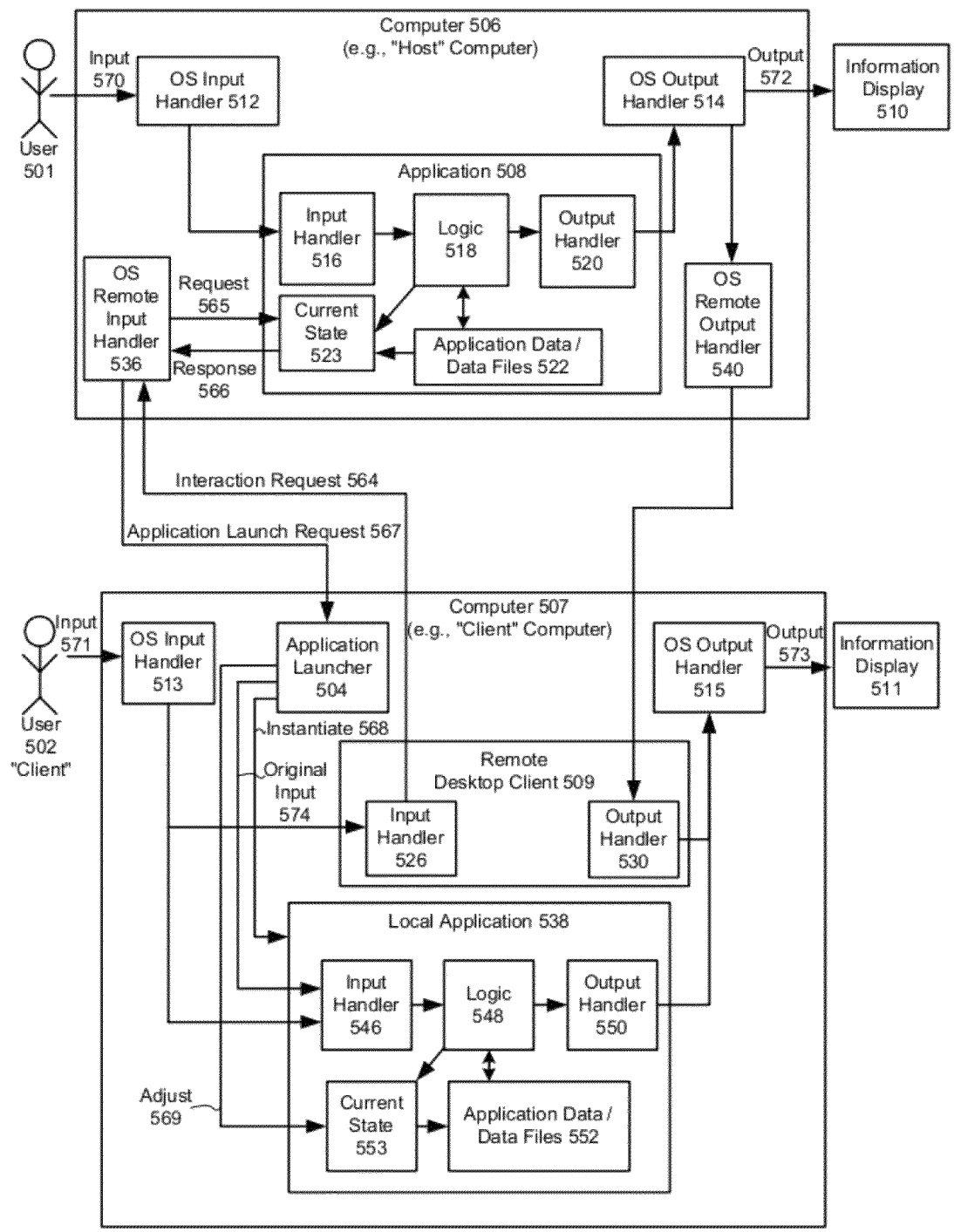
FIG. 5 illustrates how a computing domain or environment, such as that shown in FIG. 4, can instead utilize an application's current state, to enable a collaborative desktop environment, in accordance with an embodiment.

FIG. 5 illustrates how a computing domain or environment, such as that shown in FIG. 4, can instead utilize an application's current state, to enable a collaborative desktop environment, in accordance with an embodiment. As shown in FIG. 5, interactions made by a user (e.g., a client user) through a remote desktop window on an application (e.g., a host application) can result in the host application being opened on the client user's computer. In accordance with an embodiment, the client user can have two applications running, a remote desktop window where the client user follows another user's (e.g., a host user) activities, and a new instance of the host application running locally on the client user's computer, but in a different state. User activity on the local application made by the client user only effects the local application. Activity made by the host user on the host application will result in a change on the host applications, and an updated information display in the client's remote desktop windows.

Although in the example shown in FIG. 5, a host computer having a host application is described, wherein the host application is accessed by a client user, in accordance with other embodiments, the system can reside on a single shared computing device. For example, the shared computing device can have a first application instance, wherein the user activity made by a first user at the shared computing device instantiates a second application on the shared computing device having a state substantially identical to that of the first application, for use by a second user. Additionally, as described above, the labels "host" and "client" are used herein to differentiate two instances of an application (or device), but these labels can be interchanged.

As shown in FIG. 5, a user 502 (e.g., a client user) can interact with a remote desktop application 509 at a computer 507 (e.g., a client computer). The client user can, e.g., interact with an application 508 (e.g., host application) at a computer 506 (e.g., host computer). Although in this example a host user and client user are described, any plurality of users can collaborate. In accordance with an embodiment, the host computer includes an application having an input handler 516, a logic component 518, an output handler 520 and application data/data files 522. An interaction input/request 570 from a user 501 (e.g., host user) is received by the application input handler from an OS input handler 512. The application input handler communicates the input (i.e., interaction input/request) to the application logic component which updates the application state and updates the application data/data files used by the application. The host application converts the current state to a visual output to be displayed on an information display 510. For example, an OS output handler 514 receives the visual output from the application output handler. The OS output handler decides how much of the entire window will be displayed, where on the information display the window will be located, and communicates the visual output 572 to the information display. The OS output handler also communicates the visual output to an OS remote output handler 540, which in turn communicates the visual output to an output handler 530 at the remote desktop client application for display at an information display 511 (e.g., a client information display).

In accordance with an embodiment, the remote desktop client application includes an input handler 526 and an output handler. The input handler at the remote desktop communicates 564 the interaction request to an OS remote input handler 536, which requests 565 a complete record of the host application's current state from a current state component 523 at the host application. In accordance with an embodiment, the current state component collects application data/data files, which can include metadata describing how to start the host application on the client user's computer, and metadata to instantiate a local instance of the host application on the client computer having the same state as the host application. For example, the application data/data files can include instructions describing how to download and install the host application, the application settings such as menus and options that are enabled on the host application, the privacy setting (e.g., shared or private) of the file(s) controlled by the host application, the location (e.g., a URL or network sharing information) for the file(s) controlled by the host application, the current configuration information of the host application, such as scroll location of all scrollable and configurable sections of the host application, application session information such as cookie files (e.g., when the host application is a web browser), and information about actionable sections of the host application such as a URL behind a link on the host application. Alternatively, if a cloud-based system is used to maintain the application data/data files, the current state component can refer to a link to the location of the application data/data files in the cloud-based system. The current state information, local files, and if applicable, the link to the cloud-based system having the application data/data files are returned 566 to the OS remote input handler.

In accordance with an embodiment, the OS remote input handler at the host computer communicates an application launch request 567 to an application launcher 504. The application launcher receives the application data/data files, in addition to the application/launch information. In accordance with an embodiment, if the host application is not installed on client user's computer, the application launcher initiates a download and install of a compatible host application for the client user's computer. If the host application is a "premium application" (e.g., an application that requires some form of payment), then the application launcher requests payment for the application. Once installed, the application launcher instantiates 568 an instance of the host application as local application 538 on the client computer.

The local application includes an input handler 546, application logic 548, an output handler 550, a current state component 553 and application data/data files 552. Once the local application is started, application launcher communicates 569 the application data/data files to the current state component, and adjusts the local application's current state to the same state as the host application's state using the current state information (i.e., the application data/data files) of the host application. For example, the local application data/data files will be updated and all internal state variables will be set to replicate the host applications state variables, including link to cloud-based files if applicable. The cursor and application position and size can also be set to the same position as in the host application.

In accordance with an embodiment, the application launcher communicates 574 the original interaction input/request made by the client user on the remote desktop application to the input handler of the local application. For example, an input 571 received at an OS input handler 513 is communicated to the input handler 546 on the local application. The local application converts the current state to a visual output to be displayed on the information display. An OS output handler 515 receives the visual output from the output handler at the local application. The OS output handler decides how much of the entire window will be displayed, where on an information display the window will be located, and communicates the visual output 573 to the information display.

Figure 6:
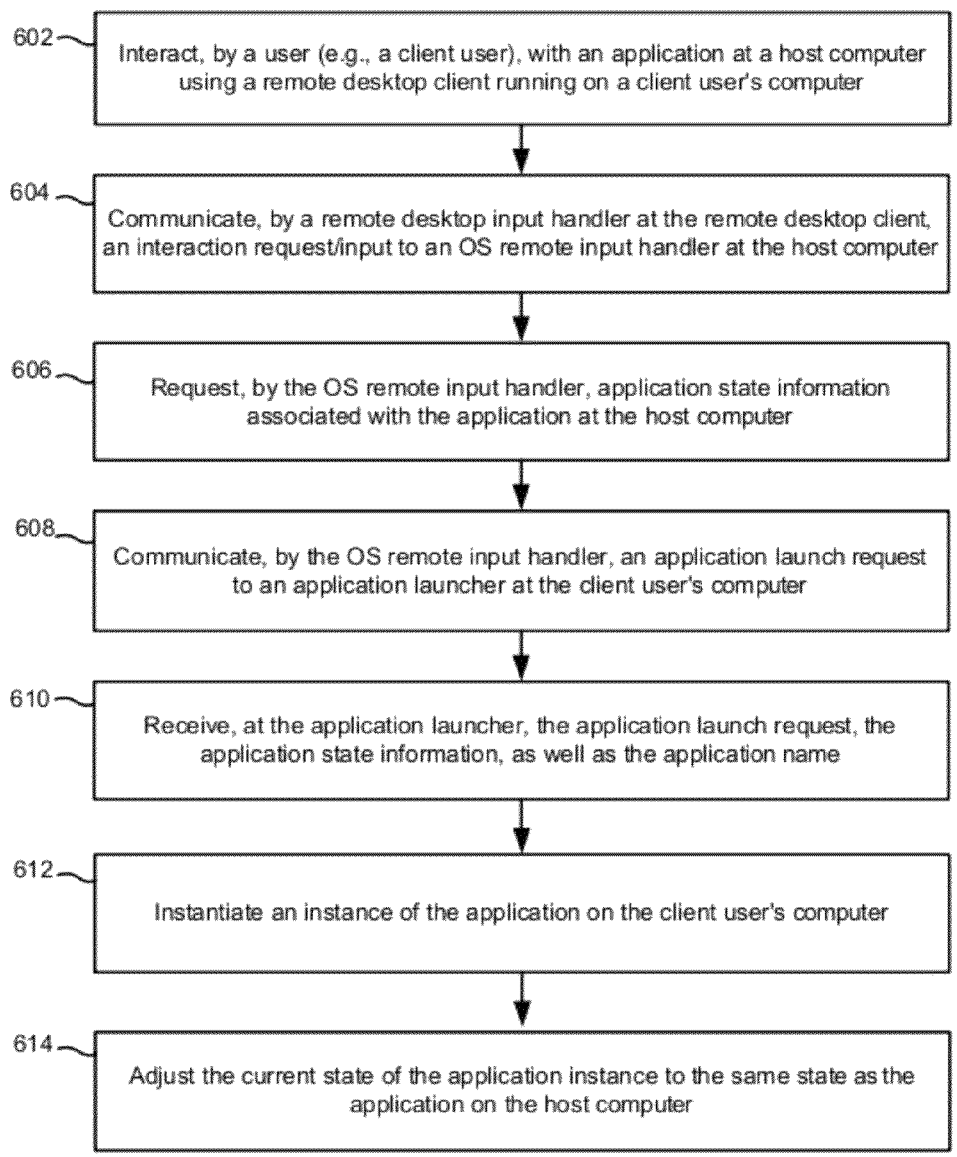
FIG. 6 shows a flow chart of a method in accordance with an embodiment, for providing a collaborative remote desktop system.

FIG. 6 shows a flow chart of a method in accordance with an embodiment, for providing two-way collaboration in a collaborative desktop system. As shown in FIG. 6, at step 602, a user (e.g., a client user) interacts with an application (e.g., a host application). The client user can interact with the host application using a remote desktop client application. The interaction can include, e.g., selecting a web link on the host application. At step 604, a remote desktop input handler at a host computer forwards an interaction request to an OS remote input handler on the host computer. Although in this example a host user and client user are described, any plurality of users can collaborate.

At step 606, upon receiving the interaction request, the OS remote input handler obtains a complete record of the host application's current state from a current state component. In accordance with an embodiment, the current state component collects host application data/data files, such as current application state information. In accordance with an embodiment, the application data/data files can include metadata describing how to start the host application on the client user's computer, and metadata to instantiate a local instance of the host application on the client computer having the same state as the host application. At step 608, the OS remote input handler communicates an application launch request to an application launcher at the client computer. The current state information, local files, and if applicable, a link to the cloud-based system having the current application state files are used to launch an instance of the host application on the client user's computer. At step 610, the application launcher receives the application launch request, the application state information, in addition to the host application installation/launch information, to launch an instance of the host application on the client user's computer.

In accordance with an embodiment, the application launcher determines whether the host application is installed on the client user's computer. If the host application is not installed on the client's computer, then an instance of the host application is installed on the client user's computer. If the host application is a premium application (e.g., an application that requires payment), then the application launcher requests payment. At step 612, an instance of the host application is installed and instantiated on the client computer. At step 614, upon installing and instantiating the application instance, the application launcher adjusts the application instances current state to the same state as the host application's state. Once the state is set for the application instance, the application launcher communicates the original interaction request made by the client user to the input handler of the application instance. The application instance then operates independent from the application at the host computer which it was instantiated from.

Figure 7:
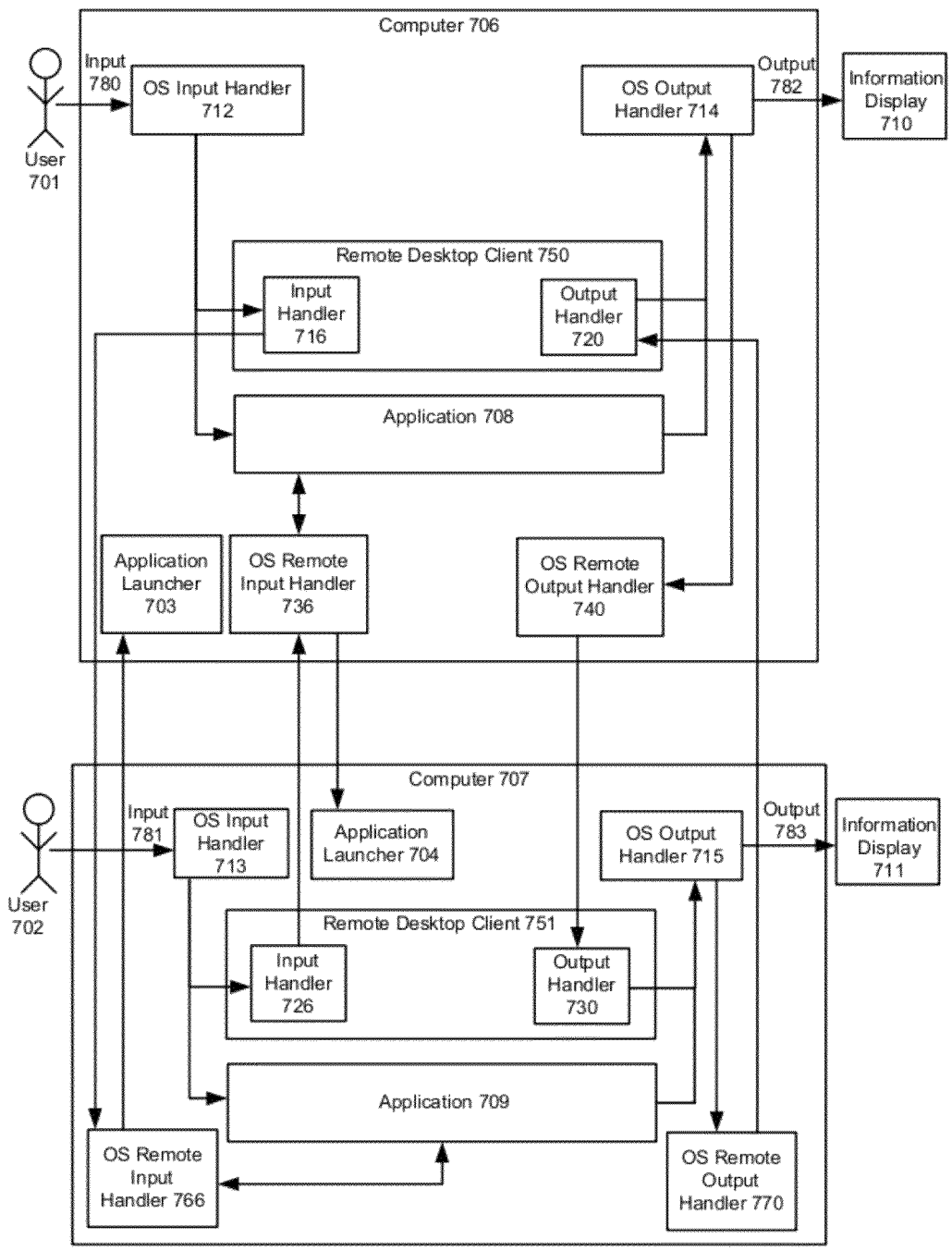
FIG. 7 shows an illustration of an exemplary system for two-way collaboration, in accordance with an embodiment.

FIG. 7 shows an illustration of an exemplary system for two-way collaboration, in accordance with an embodiment. Although in the example shown in FIG. 7, a first user and a second user are described, any plurality of users can collaborate. Additionally, although the users will be referred to as a first user and a second user, either user can be an active user or a passive user. In accordance with an embodiment, an active user shares their information display to another user. An active user can become a passive user if they discontinue sharing their information display, and a passive user can become an active user by sharing their information display. For example, a passive user can have a remote desktop application running to collaborate with an active user's computer. The passive user can become an active user when the passive user shares their information display to other users.

As shown in FIG. 7, two users are in a two-way collaborative remote desktop setup. As described above, although in this example a first computer having a first application is described, where the first application is accessed by a second user, in accordance with other embodiments, the system can reside on a single shared computing device. For example, the shared computing device can have a first application instance, where user activity made by a different user at the shared computing device instantiates a second application on the shared computing device having a state substantially identical to that of the first application. As further shown in FIG. 7, user 701 (e.g., first user) is running an application 708 (e.g., a local application) which the user interacts with, and a remote desktop client application 750 showing a second user's 702 interactions with an application 709 (e.g., a local application). The second user is running the application which the user interacts with, and a remote desktop client application 751 showing the first user's interactions with their local application.

In accordance with an embodiment, changes made by the second user on their local application are executed locally on their computer. The result of the changes is visible on information display 711, in addition to a remote desktop window on the first user's information display 710. For example, computer 707 includes the local application and the remote desktop client application. The remote desktop client application includes an input handler 726 and an output handler 730. Input 781 from the second user is received at an OS input handler 713, which communicates the input to the local application. The local application processes the input and produces a visual output to be displayed on the information display. For example, an OS output handler 715 receives the visual output from the application and decides how much of the entire window will be displayed, where on the information display the window will be located, and communicates the visual output 783 to the information display. The OS output handler also communicates the visual output to an OS remote output handler 770. The OS remote output handler communicates the visual output to an output handler 720 at the remote desktop client application at the first user's computer, which communicates the visual output to an OS output handler 714 for display at an information display 710.

In accordance with an embodiment, any changes made by the first user at their local application are executed only at the local application. The result is visible on the information display, in addition to the remote desktop window on the second users information display. For example, computer 706 includes the local application and the remote desktop client application. The remote desktop client application includes an input handler 716 and the output handler. An interaction input/request 780 is received at an OS input handler 712. The input handler communicates the input to the local application, which processes the input and produces a visual output to be displayed on the information display. The OS output handler receives the visual output from the application and decides how much of the entire window will be displayed, where on the information display the window will be located, and communicates the visual output 782 to the information display. The OS output handler also communicates the visual output to an OS remote output handler 740, which in turn communicates the visual output to the output handler at the second user's remote desktop client application. The output handler communicates the visual output to the OS output handler for display at the information display for the second user 711.

In accordance with an embodiment, in those instances when the first user decides to interact with the second user's local application through the remote desktop client application, then an instance of the second user's local application will be instantiated on the first user's computer. The second user's information display will show two applications running; the first user's local application and the instance of the second user's location application. For example, an input to interact with the second user's local application is received at an OS input handler 712, and is communicated to an input handler 716 at the remote desktop client application. The input is communicated from the input handler to an OS remote input handler 766, which communicates with the local application at the second user's computer to receive current state information for the local application. The OS remote input handler communicates the current state information to an application launcher 703, and the application launcher uses the current state information to instantiate an instance of the second user's local application on the first user's computer having substantially the same application state. In accordance with an embodiment, after an instance of the second user's local application has been instantiating on the first user's computer, subsequent interactions between the first user and the second user's local application can update the state of the instance of the second user's local application on the first user's computer using the current state information of the second user's local application. Similarly, in accordance with an embodiment, after an instance of the second user's local application has been instantiating on the first user's computer, subsequent interactions between the second user and that instance of the second user's local application on the first user's computer can update the state of the second user's local application using the current state information of that instance of the second user's local application on the first user's computer.

In accordance with an embodiment, in those instances when the second user decides to interact with the remote desktop application to interact with the first user's local application, then an instance of the first user's local application will be instantiated on the second user's computer. The first user's application display will show two applications running; the second user's local application and the instance of the first user's location application. For example, an input to interact with the first user's local application 708 is received at the input handler 726 at the second user's remote desktop client application from the OS input handler, and communicated from the input handler to an OS remote input handler 736. The OS remote input handler communicates with the local application 708 at the first computer to receive current state information associated with the local application, and communicates the current state information to an application launcher 704. The application launcher uses the current state information to instantiate an instance of the first user's local application having substantially the same application state. In accordance with an embodiment, after an instance of the first user's local application has been instantiating on the second user's computer, subsequent interactions between the second user and the first user's local application can update the state of the instance of the first user's local application on the second user's computer using the current state information of the first user's local application. Similarly, in accordance with an embodiment, after an instance of the first user's local application has been instantiating on the second user's computer, subsequent interactions between the first user and that instance of the first user's local application on the second user's computer can update the state of the first user's local application using the current state information of that instance of the first user's local application on the second user's computer.

Figure 8:
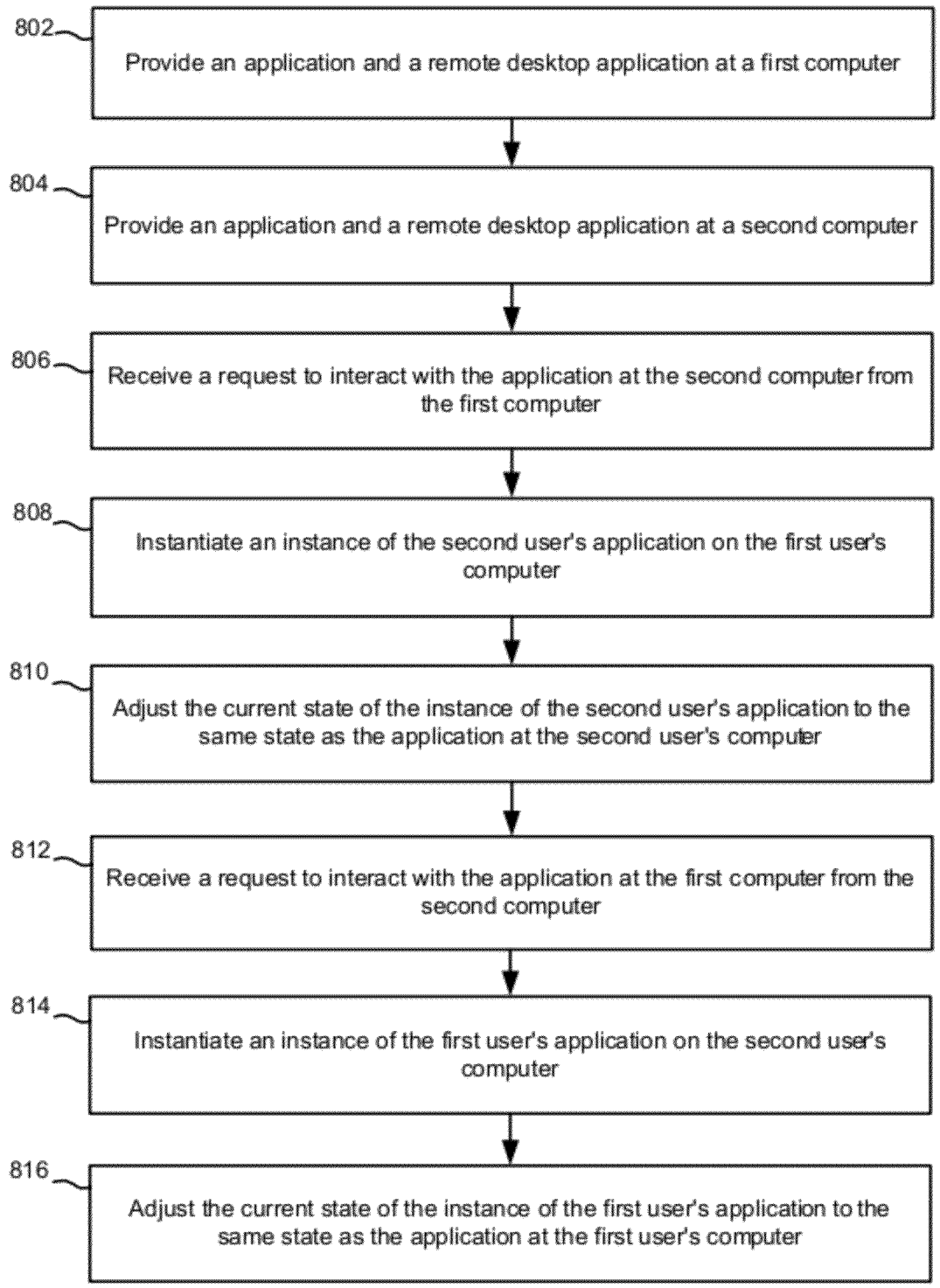
FIG. 8 shows a flow chart of a method in accordance with an embodiment, for providing a two-way collaboration system.
Figure 9A:
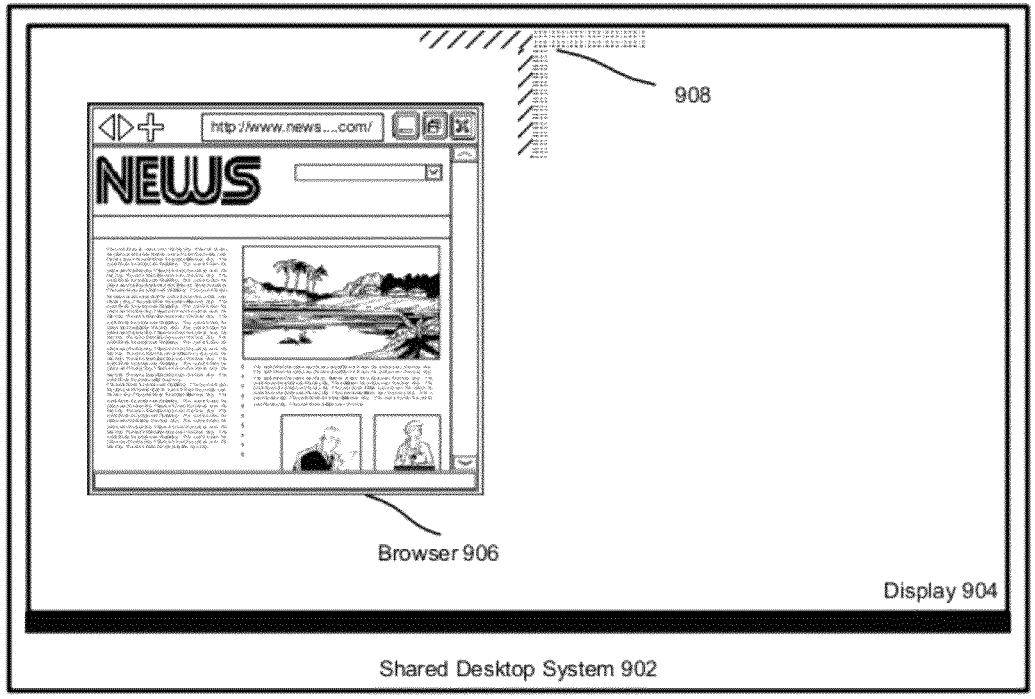
FIGS. 9A-9D show an illustration of how the system can be used to provide a shared desktop implementation, in accordance with an embodiment.
Figure 9B:
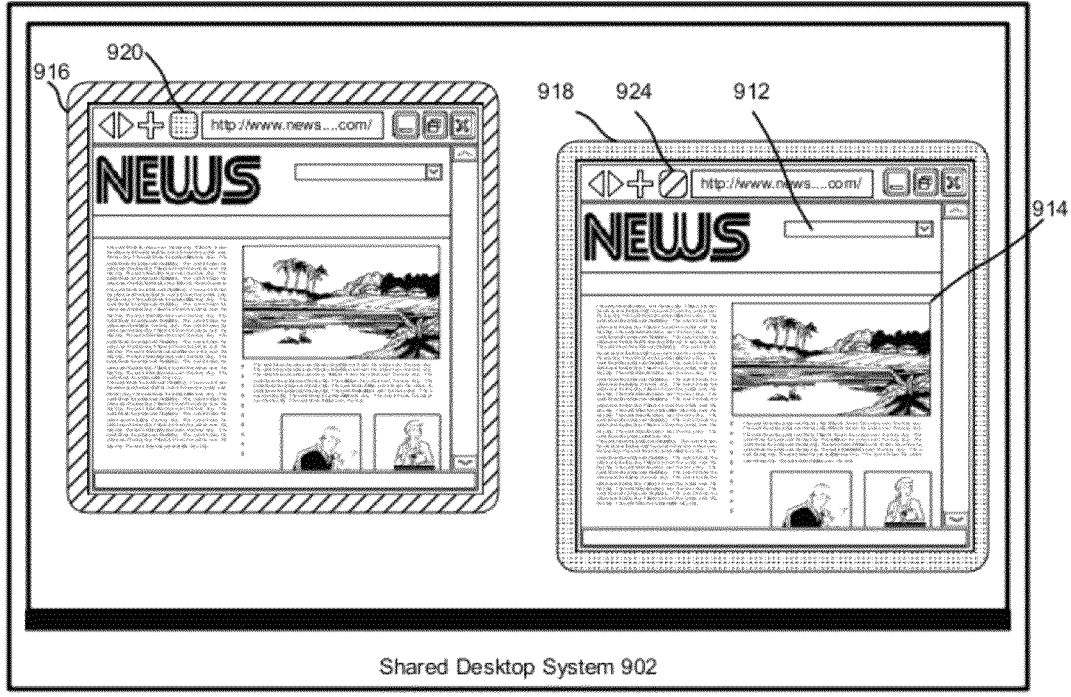
Figure 9C:
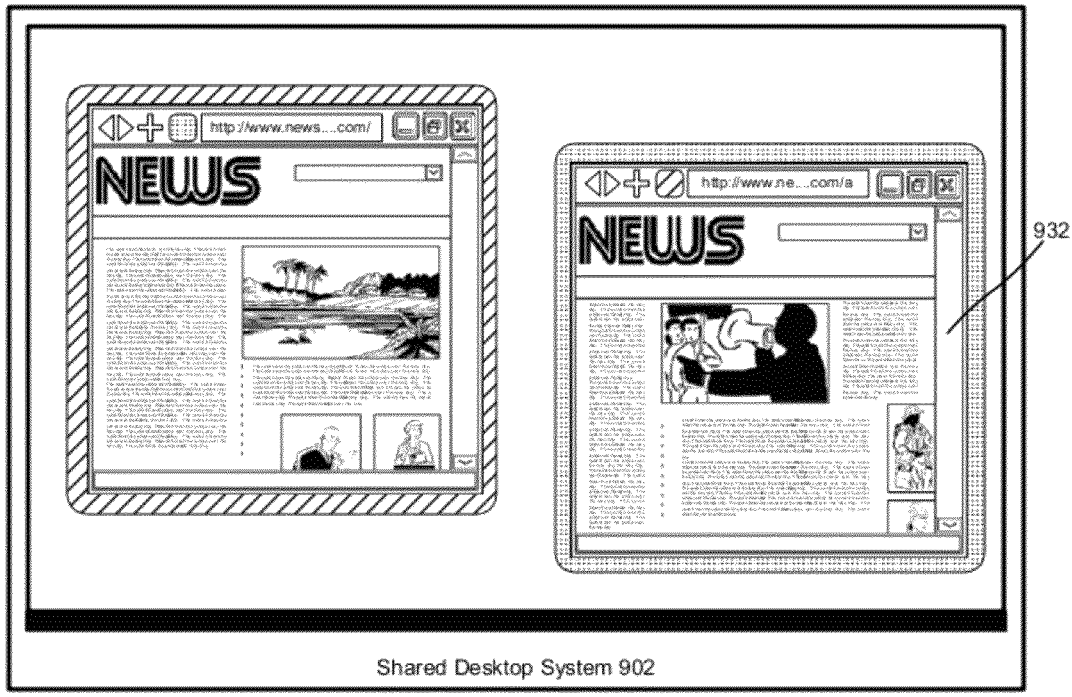
Figure 9D:
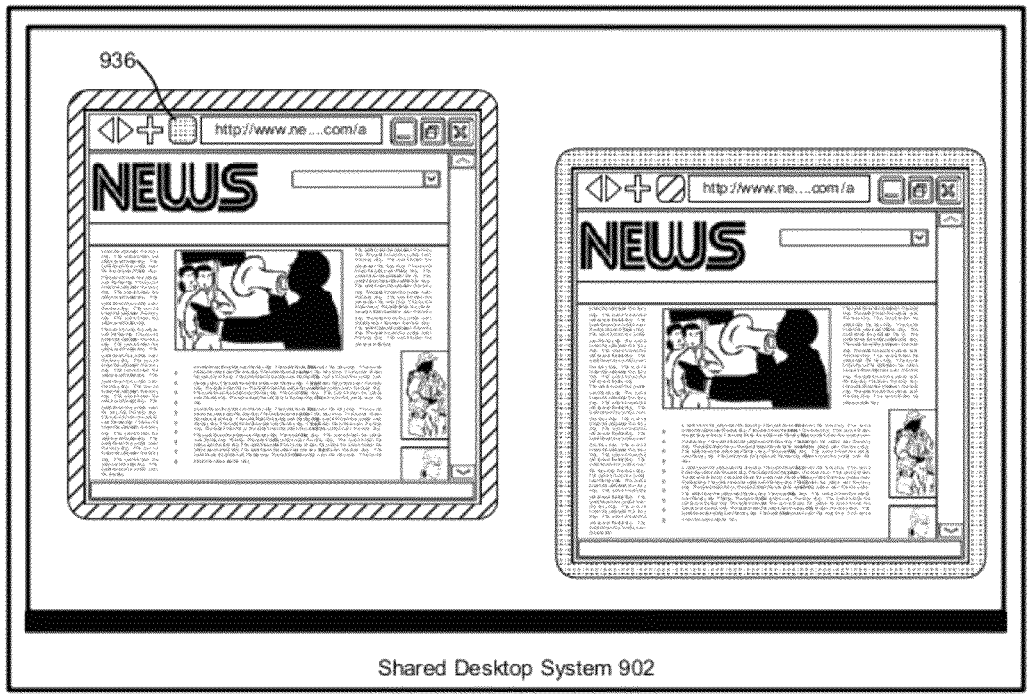

FIG. 8 shows a flow chart of a method in accordance with an embodiment, for providing two-way collaboration in a collaborative desktop system. Although in this example a first user and a second user are described, any plurality of users can collaborate. Additionally, although the users will be referred to as a first user and a second user, either user can be an active user or a passive user. At step 802, an application (e.g., a local application) and a remote desktop client application are provided at a first computer. The local application can be, e.g., a web browser or another application. The remote desktop client application is used by the first user to interact with an application on a second computer. At step 804, an application (e.g., a local application) and a remote desktop client application are provided to a second user. At step 806, the first user interacts with the local application at the second user's computer. The first user interacts with the second user's local application using the first user's remote desktop application. At step 808, an application instance of the second user's application is instantiated on the first user's computer after the first user interacts with the second user's local application. At step 810, the current state of the application instance of the second user's application is adjusted to the same state as second user's local application. At step 812, the second user interacts with the first user's local application using the second user's remote desktop client application. At step 814, an application instance of the first user's application is instantiated on the second user's computer after the second user interacts with the first user's local application. At step 816, the current state of the application instance of the first user's application is adjusted on the second user's computer to the same state as first user's local application.

In accordance with various other embodiments, the remote desktop client application used by the second user can display the name and/or icon of the application(s) running on the first user's computer. When the second user requests to activate one of these applications by selecting the application name or icon of the available applications, the local start and activation sequence taken on the second user's computer to instantiate a local instance of the first user's application will only launch, activate, and bring the application to the same state locally on the second user's computer. Since there are no local actions made by the second user through the remote desktop system, no actions are taken on the new local application. In accordance with various other embodiments, the remote desktop client application used by the second user can display an indication of the first user, such as a name indicator, color indicator or icon indicator representing the first user. When the second user requests to activate an application on the first user's device, the currently active application on the first user's device is instantiated to the same state locally on the second user's device. For example, devices with smaller screens, such as mobile phones or other portable mobile devices, where there is not enough screen size to show the entire window of an application, but there is enough space on the display to show a list of available applications, or an indication of the user hosting the application, can be used to select an application running on a first computer or be used to select a user hosting the application. This provides for the ability to transfer applications with state between both mobile and mobile devices or mobile and standard devices.

The above examples illustrate how two or more users can collaborate using a collaborative desktop system. Users of a shared application can interact with the application without impacting the other users. For example, the interaction made by a remote user will result in a local application being opened on the remote user's computer. The application is opened in the same state as the shared application, and any interaction on the local application is executed locally on the remote user's computer. Since all information displays are shared between all users, the other users will still see the remote desktop window showing the shared application, where the shared application and state is unchanged. The other users will also see a new remote desktop window from the new remote active user. The new remote desktop window will display the same application as on the shared application, but in a different state.

In accordance with an embodiment, systems such as those described herein can significantly impact the sales and advertisement of applications. For example, presenting an application to a user that has a need for the application is a key issue when dealing with application sales. Industry experience places significant weight on reviews by other users as an important factor in deciding whether to purchase an application, and even more valuable is the word-of-mouth from trusted users such as friends and family. However, a user may not be aware of what applications a friend or family member is using, so it is left to chance if the name of application is mentioned in conversation. Oftentimes, even when the name of the application is known, the user still needs to figure out how and where to locate the application, and how to download the program. This is often accomplished by the user searching on the internet, or they will search in a dedicated application store (for example Amazon or Apple's AppStore etc.). Nonetheless, there are several layers of friction to discovery and distribution of applications based on the most valuable lead: family and friends.

Systems such as those described herein can also aid in application discovery and distribution. For example, if one of the users (e.g., a host user) is using an application that another connected user (e.g., client/remote user) finds interesting, then the connected user can initiate an interaction with the host application through a remote desktop window. Assuming the application is not yet installed on the requesting user's computer, then the host computer can inform the requesting user's computer about where and how to download and install the application. In the event the application is free, the installation can takes place on the requesting user's computer, after which the application will start in same state as on the host computer, but now locally on the requesting user's computer. If the application is a premium application, a purchase prompt can be displayed to purchase the application.

Example Use Cases

In accordance with various embodiments, the system can be implemented to support a variety of different use cases and applications. Some examples of these use cases and applications are described below by way of illustration. It will be evident that embodiments of the invention can be implemented to support other use cases and applications, and that the invention is not limited to the example provided herein.

For example, in accordance with an embodiment, one or more users can operate their own computer, e.g., either side-by-side or remote from one another. The information display of each user can have a window of the other users' current activities. Each user can perform local interactions with the applications of the other users through the remote desktop window. In accordance with an embodiment, one or more users can use one large display, or several smaller display devices that are all connected to the same computer. Each user will have their own information display mapped to the display device (e.g., a split-screen setup). In accordance with an embodiment, each information display can have a remote desktop window from each of the other active information displays to allow the users to start local activities on their own information display. For example, an interactive large screen TV can be setup where the users can split the screen into two information displays. Each information display can render the applications run by the user owning that information display, in addition to a remote desktop window of the other users information display. The input made by users onto the large display can be accomplished through remote controls (e.g. mobile phones or similar smart electronic devices, but is not limited thereto).

In accordance with an embodiment, systems described herein can be implemented in two ways, a preemptive-feed system or a request-response system. The preemptive-feed system can bundle state information with a visual output used at an information display. This allows connected clients to the system to launch local applications at any time without requesting more data from a host system having the applications. The benefit of this approach is faster application load time. In accordance with an embodiment, the request-response system (as illustrated in FIG. 5 and FIG. 7) only forwards the visual output to be displayed on an information display of a remote user.

In accordance with an embodiment, a number of privacy options can be implemented. For example, a host user can prevent other users (e.g., remote users) from interacting with a host application and/or viewing the contents of the host application. Additionally or alternatively, a permission request system can be implemented where the host user receives a request to allow remote users to view and/or copy the host application's current state. In accordance with an embodiment, a decision to automatically share an application can be based on the application kind, and/or what the host user is using the application for. For example, remote users can be automatically restricted from copying the host users browsing session that is based on SSL encryption. Such a session can be, e.g., a banking or email session.

Shared Desktop Implementation

FIGS. 9A-9D shows an illustration of how the system can be used to provide a shared desktop implementation, in accordance with an embodiment. As shown in FIGS. 9A-9D, a first user can use, e.g., a multi-touch enabled desktop computer 904 with a browser window 906, to browse the Internet or web within a browsing session. A second user, who is aware of and wants to participate in the browsing session, starting from a substantially similar position and state as the first user, can issue a split-screen or other recognized gesture or command to instruct the system to split the screen display.

For example, in accordance with an embodiment either the first or second user can instruct the system 902 to split the screen display by tracing their finger from a border of the display towards its center. In accordance with an embodiment, while the user traces their finger the computer graphically illustrates the movement by displaying a colored "T"-shaped graphical device 908 that grows in size as the gesture approaches activation. When the user's finger travels a sufficient distance, the system recognizes this as a request to split the screen display. In accordance with other embodiments, the system can recognize other gestures or commands to split the screen display, e.g., by use of an explicit button or voice command.

In accordance with an embodiment, when the system detects a request to split the screen display, a new browser window is created and displayed 912, which is designated to the second user, but which uses the same uniform resource locator (URL), content, zoom and scroll bar position 914, as the original browser window, which remains designated to the first user. In other words, the new browser window and browsing session includes substantially the same position and state as the original browser window and browsing session. Additional browser windows and browsing sessions can be similarly created, each one including substantially the same position and state as its predecessor.

In accordance with an embodiment, when multiple users are participating and browsing using a split-screen display, each user is associated with a color or other indication that uniquely identifies that particular user. Each browser window is associated with a colored border 916, 918 and 932 that identifies its controlling user, and also displays one or more appropriately colored msync icons 920, 924 for each of the other participating users. Colors can be assigned using, e.g., a static list, wherein the first entry in the list is always assigned to the first user of the system, and each subsequent request to split the screen display increments the color index and assigns the next color in the list to the next participating user. Different colors can also be used during the operation of the split gesture, e.g., the sides (left, right, top, bottom) of the "T"-shaped graphical device can be given a user color for which side of "T" that the new user window will be created. Should the user choose to finalize the split gesture, the side chosen to create the new window will be determined from the split gestures position relative to the center of the original user's window—any of the 4 borders of the monitor can be used to active a split.

Subsequent to the system splitting the display screen, and creating and displaying the new browser window, the second user can thereafter control their instance of the browser window and browsing session to browse the web, e.g., by clicking on links therein to other articles, or otherwise navigating away from the initial page or scroll the content.

At any subsequent point in time, if any user wants to "borrow from" the browsing session of any other user (e.g., because they are interested in the contents of that other user's current browser window) the user can perform an msync with that user by clicking the appropriately colored msync icon 936. Such borrowing can happen back-and-forth between the multiple users.

The above example illustrates how two or more users can browse independently, and yet synchronize their browsing location with each other at any time once a publishing session has started. Additional users can be added by performing a split gesture again. Because the multi-user behavior is taking place on the same monitor (or in several monitors in close proximity), a publishing group can be created without prior account creation or authentication, which simplifies the process for the user of getting started. Additionally, in accordance with various other embodiments, a publishing group can be automatically defined based on users connecting within the same network, e.g., an IP subnet. This setup allows mobile users connected on the same network to synchronize their browsing location with each other, and follow other mobile users, as well as all desktop users on the same network.

Shared Group Implementation

Figure 10A:
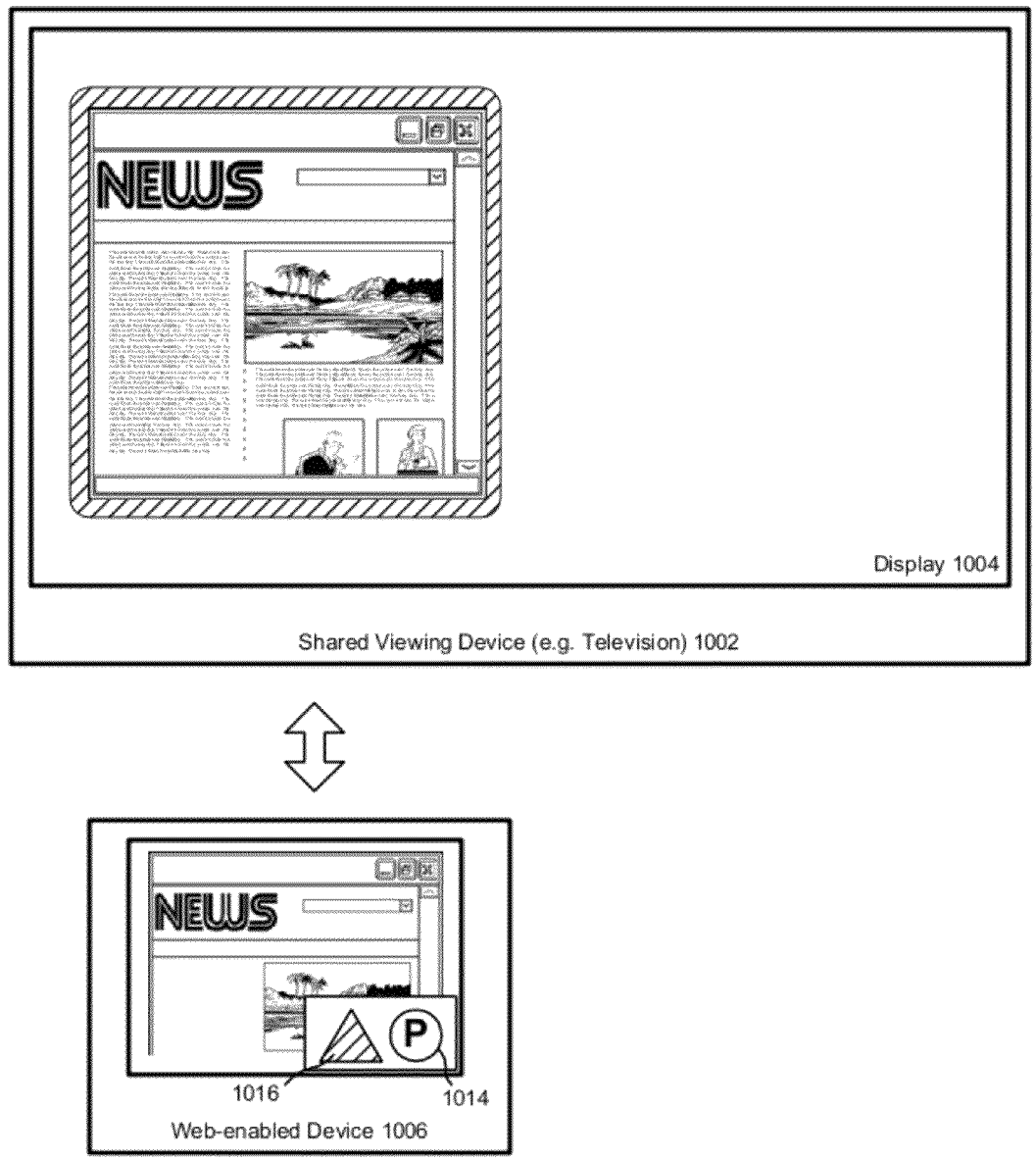
FIGS. 10A-10C show an illustration of how the system can be used to provide a shared group implementation, in accordance with an embodiment.
Figure 10B:
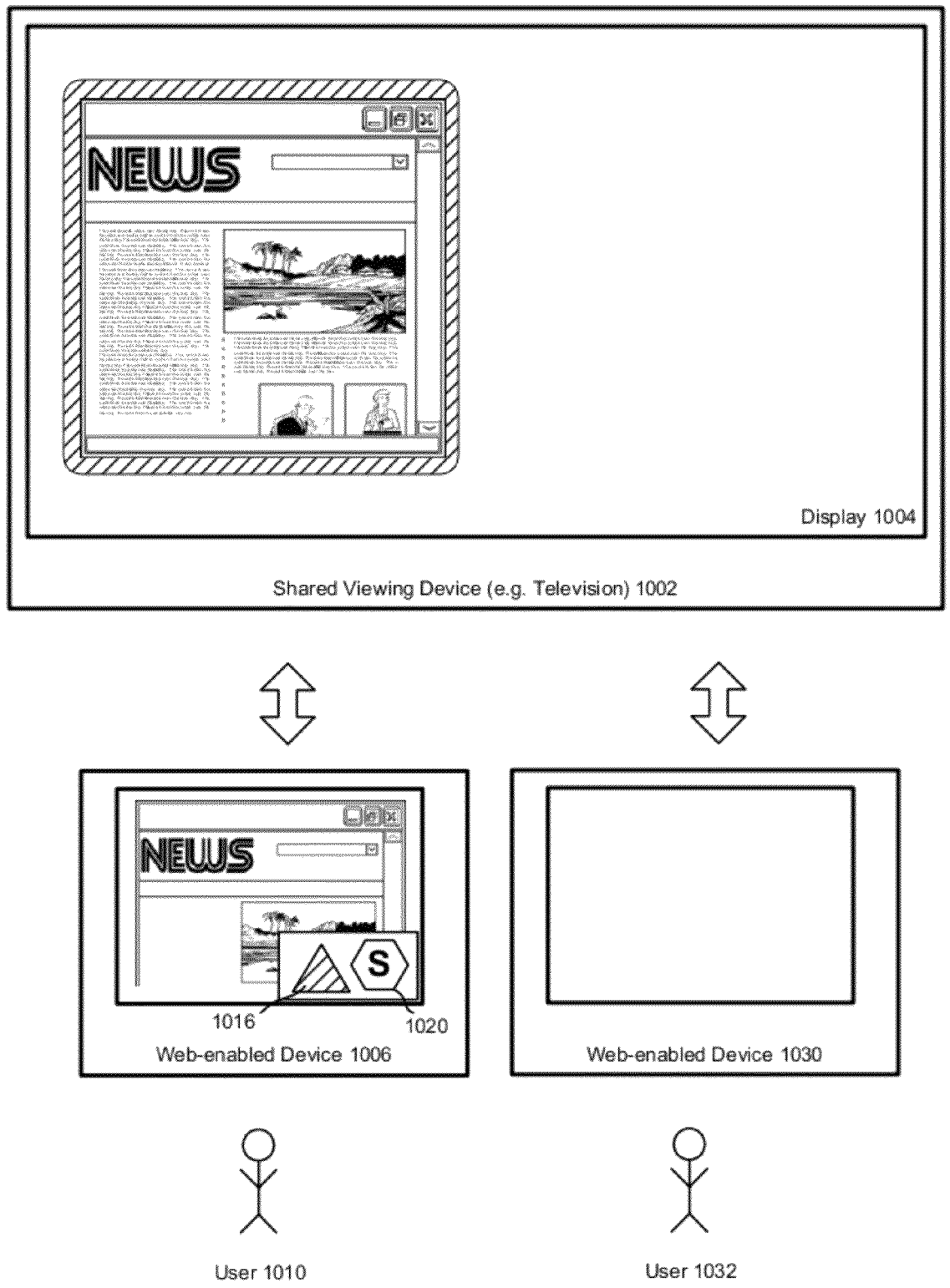
Figure 10C:
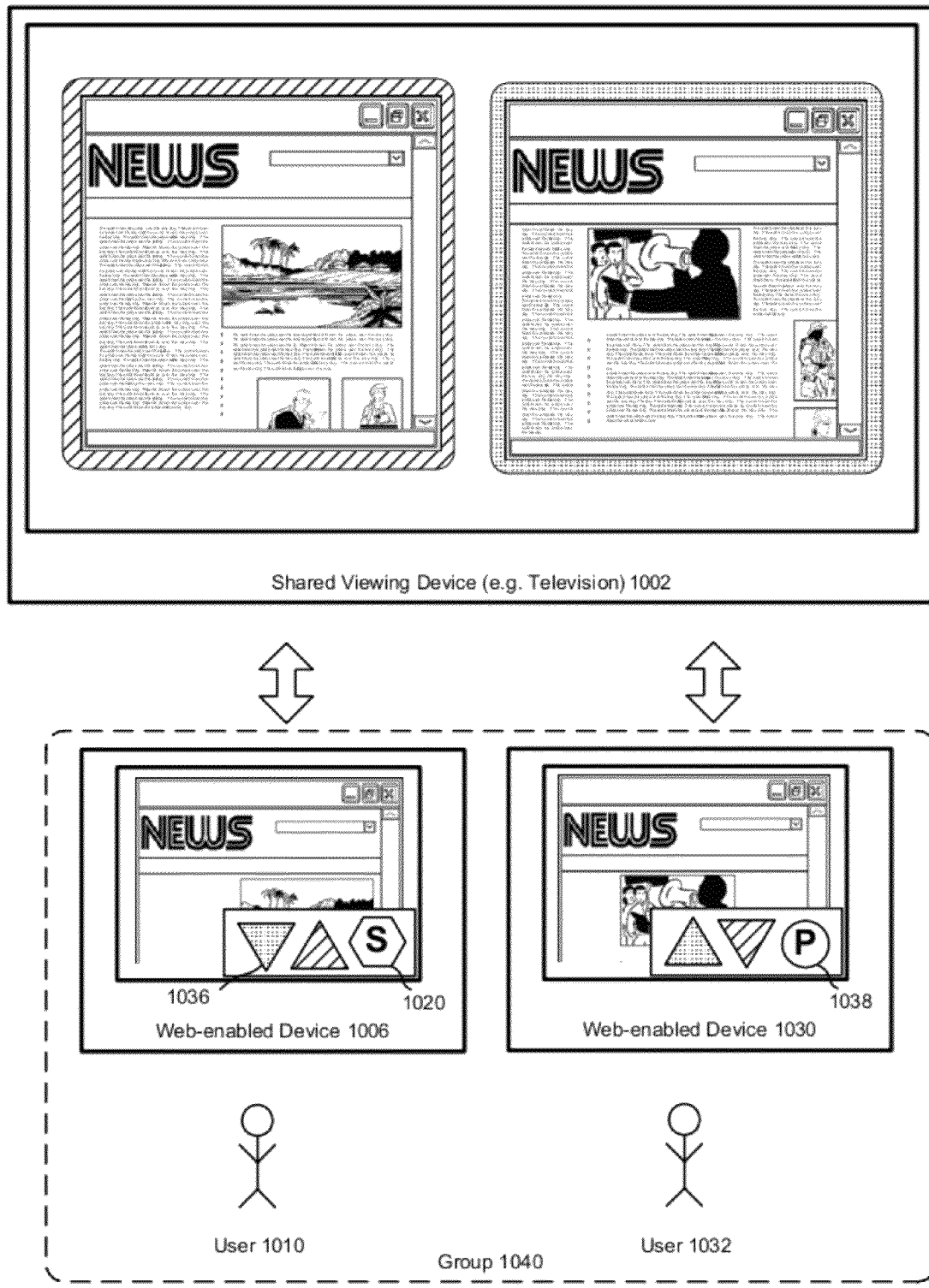

FIGS. 10A-10C shows an illustration of how the system can be used to provide a shared group implementation, in accordance with an embodiment. As shown in FIGS. 10A-10C, a group of two or more users are viewing content on a shared viewing device 1002 that includes a display 1004, e.g., watching a movie on a television together. At least one or more of the group 1010 is also currently browsing the web on a personal Internet or web-enabled device 1006, e.g., a smartphone, tablet, or other computing device that includes a display and a browser window.

In accordance with an embodiment, each user and/or their web-enabled device is associated with a color or other indication that uniquely identifies that particular user/device within the group. When their browser recognizes other available viewing devices or web-enabled devices, it displays an appropriately-colored icon for those other devices 1036. Colors can be assigned using, e.g., a static list, wherein the first entry in the list is always assigned to the first user/device, and each subsequent user/device is assigned the next color in the list. In accordance with an embodiment, a shared viewing device push icon 1016 can be provided to allow a user to push a copy of their online content to the shared viewing device. A publish icon 1014 can be provided to allow a user to publish a live feed of their online content to other Internet-enabled devices within the group. When the recipient device is the shared viewing device, e.g., a television, the color associated with the device that pushed its online content to the television can be used as a border around the television window. This allows each user viewing the television to know which user's online content is currently being displayed on the television. While television is mentioned in this scenario, it could also be any other device used for media presentation such as a computing device with a large monitor or a projector.

When a device is used to publish a copy of their online content to other web-enabled devices, any user currently participating in the group 1040 can subscribe to or otherwise copy the current state of online content from any publishing user within the group, regardless of whether that content is currently being displayed on the shared viewing device. For example, when group members are physically present within the same room, a wish to synchronize devices can be conveyed verbally. This means that, although the shared viewing device is a useful means of informing users of each other's browsing session, the system can also operate without a shared viewing device, relying instead on other communication (e.g., verbal) means which leads to users pressing a msync button 1036 on their computing device 1006.

When a user's online content is msync'd to a subscribing web-enabled device, the state of their browsing session is copied to the subscribing device, and the browser window on the subscribing device is updated to use the same uniform resource locator (URL), content, zoom and scroll bar position, as the original browser window, which remains designated to the publishing device. In other words, the new browser window and browsing session includes substantially the same position and state as the original browser window and browsing session.

In accordance with an embodiment, if a user clicks their publish icon, their publish icon is modified to indicate the user is in a publishing mode, and that other users within the group can copy their current state of online content. If the user also clicks their push icon, the online content currently displayed on their device is also replicated live to the shared viewing screen 1002, surrounded by the user's associated color.

Depending on the implementation, e.g., the available display area on the shared viewing device and the settings of the users, the system can simultaneously display a plurality of content windows on the shared viewing device. When no users are pushing content, the default is to use the entire screen for display. As users begin pushing content, the screen display can be split, up to a maximum determined limit, at which point the system can being removing the oldest content first. This provides a flexible approach for allowing additional users to participate in the group while using the shared display real estate effectively.

At any time a user can either discontinue publishing and/or discontinue pushing their online content 1020. Discontinuing pushing does not in itself stop the publishing, but does result in that users/device's window being removed from the shared display, and leaves room for other users to push their content, or for shared content to assume a larger portion of the available area. If the user discontinues publishing, then the system considers the user to have left the group, and will discontinue any live online content feed being delivered to that device.

In accordance with an embodiment, when a new user 1032 joins the group and starts a compatible browser device 1030, by default the new user will not be in a publishing mode, but instead a publish icon 1038 will be available. If a compatible shared viewing device is present then a shared viewing device push icon will also be available in the new user's assigned color. The operation of these icons is as described above. For each user that is currently publishing content within the group, a user-colored msync button will be available. Since the new user will not yet be publishing, other users will not yet see an msync button that allows them to subscribe to or otherwise copy the current state of online content from that new user. Once the new user choose to push or publish their online content then, in addition to the previously described actions, all other users within the group will now see a user-colored sync button 1036 for that new user.

In accordance with an embodiment, the system can use a cloud-based or other Internet-based service to connect groups and devices, and to enable sharing of online content or browsing sessions over the Internet. In accordance with other embodiment, groups and devices can be automatically created, e.g. within a shared IP subnet, or within a shared WiFi zone, which minimizes the need for configuring the system.

The above example illustrates how two or more personal Internet or web-enabled devices can be used to independently browse content, while at the same time synchronize with each other when needed, and illustrates how a shared viewing device is a useful means of informing users of each other's browsing session, although as described above the system can also operate without a shared viewing device, relying instead on other communication (e.g., verbal) means to trigger the interest to start publishing and to perform an msync.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for enabling a collaborative remote desktop environment, comprising:
    a computing device having a processor;
    a first application instance executing on the processor, operating as a host by a first user, that has an application state associated therewith, the application state having application state data adequate to enable a another computing device or application instance to reach a substantially similar application state, and the first application instance converting the application state into a visual output to be displayed on a first information display to the first user;
    the first application instance is associated with
        an application input handler,
        an application logic component,
        an application output handler, and
        a current state component that collects one or more application data or data files that determine the application state associated with the first application instance;
    a remote input handler, associated with the computing device and the first application instance, that
        receives an interaction request from a second user working on a remote desktop client, and
        communicates the interaction request to the current state component, which communicates the application data or data files that determine the application state associated with the first application instance to the remote input handler;
    in response to the interaction request, a remote output handler associated with the computing device and the first application instance renders the same first information display displayed to the first user on the computing device to the second user on the remote desktop client;
    in response to an input to interact with the first information display by the second user at the remote desktop client that is inconsistent with the state data of the first application instance, locally launching a second application instance at the remote desktop client for the second user, wherein the input by the second user that is inconsistent with the state data of the first application instance comprises user interaction with a graphical UI element in the first information display;
    wherein the second application instance operating as the remote desktop client on a different computing device that has a second application state associated therewith, wherein the second application instance is
        associated with an application launcher that
        receives the application data or data files that determine the application state associated with the first application instance,
        instantiates the second application instance and adjusts the second application state
        so that the second application state is substantially identical to that of the first application state, and processes the interaction request locally against the second application state;

the second application instance converting the second application state into a visual output to be displayed on a second information display to the second user; and wherein the second application instance can be operated by the second user independently from the first application instance operated by the first user, including one or more subsequent interaction requests are processed locally against the second application state.

2. The system of claim 1 wherein an input received at the first application instance results in a direct update of the data files and the current state component.

3. The system of claim 1 wherein the data files are stored in a cloud-based system.

4. The system of claim 1 wherein the application launcher, upon receiving the application state data and the data files:
   determines a compatible second application instance for the different computing device; and
   initiates a download and install of the second application instance for the different computing device.

5. The system of claim 4 wherein the application launcher determines whether the first application instance is a premium application, and wherein when the first application instance is the premium application, the application launcher requests payment.

6. The system of claim 1 wherein the application launcher launches the second application instance having an application input handler, an application logic component, an output handler, a current state component, and data files.

7. The system of claim 6 wherein the application launcher sets the current state component and the data files to be substantially identical to that of the first application instance.

8. The system of claim 1 wherein certain current state component and data files are communicated to the second application instance, and wherein the certain current state component and data files are determined based on a permission setting of the current state component and data files.

9. The system of claim 1 wherein when instantiating the second application instance, the second application instance uses the same uniform resource locator (URL), content, zoom and scroll bar position as the first application instance.

10. The system of claim 1 wherein after the second application instance has been instantiated, a subsequent interaction request to interact with the first application instance updates the state of the second application instance using the current state information of the first application instance.

11. A method for enabling a collaborative remote desktop environment, comprising the steps of:
   providing a computing device having a first application instance, operating as a host by a first user, that has an application state associated therewith, the application state having application state data adequate to enable a another computing device or application instance to reach a substantially similar application state, and the first application instance converting the application state into a visual output to be displayed on a first information display to the first user;
   the first application instance is associated with
      an application input handler,
      an application logic component,
      an application output handler, and
      a current state component that collects one or more application data or data files that determine the application state associated with the first application instance;
   receiving an interaction request, from a second user working on a remote desktop client, at a remote input handler associated with the computing device and the first application instance;
   communicating, by the remote input handler, the interaction request to the current state component, which communicates the application data or data files that determine the application state associated with the first application instance to the remote input handler;
   in response to the interaction request, a remote output handler associated with the computing device and the first application instance renders the same first information display displayed to the first user on the computing device to the second user on the remote desktop client;
   in response to an input to interact with the first information display by the second user at the remote desktop client that is inconsistent with the state data of the first application instance, locally launching a second application instance at the remote desktop client for the second user, wherein the input by the second user that is inconsistent with the state data of the first application instance comprises user interaction with a graphical UI element in the first information display;
   wherein the second application instance has a second application state associated therewith, operating as the remote desktop client on a different computing device, wherein the second application instance is associated with an application launcher;
   receiving, at the application launcher, the application data or data files that determine the application state associated with the first application instance; and
   instantiating, the second application instance and adjusting its application state so that the second application state is substantially identical to that of the first application instance, and
   processing the interaction request locally against the second application state;
   the second application instance converting the second application state into a visual output to be displayed on a second information display to the second user; and
   wherein the second application instance can be operated by the second user independently from the first application instance operated by the first user, including one or more subsequent interaction requests are processed locally against the second application state.

12. The method of claim 11 wherein an input received at the first application instance results in a direct update of the data files and the current state component.

13. The method of claim 11 wherein the data files are stored in a cloud-based system.

14. The method of claim 11 wherein the application launcher, upon receiving the application state data and the data files:
   determines a compatible second application instance for the different computing device; and
   initiates a download and install of the second application instance for the different computing device.

15. The method of claim 14 wherein the application launcher determines whether the first application instance is a premium application, and wherein when the first application instance is the premium application, the application launcher requests payment.

16. The method of claim 11 wherein the application launcher launches the second application instance having an input handler, an application logic component, an output handler, a current state component, and data files.

17. The method of claim 16 wherein the application launcher sets the current state component and the data files to be substantially identical to that of the first application instance.

18. The method of claim 11 wherein after the second application instance has been instantiated, a subsequent interaction request to interact with the first application instance updates the state of the second application instance using the current state information of the first application instance.

19. The method of claim 11 wherein certain current state component and data files are communicated to the second application instance, and wherein the certain current state component and data files are determined based on a permission setting of the current state component and data files.

20. A non-transitory computer readable storage medium storing one or more sequences of instructions for enabling a collaborative remote desktop environment, wherein said instructions, when executed by one or more processors, cause the one or more processors to execute the steps of:
  providing a computing device having a first application instance, operating as a host by a first user, that has an application state associated therewith, the application state having application state data adequate to enable a another computing device or application instance to reach a substantially similar application state, and the first application instance converting the application state into a visual output to be displayed on a first information display to the first user;
  the first application instance is associated with
    an application input handler,
    an application logic component,
    an application output handler, and
    a current state component that collects one or more application data or data files that determine the application state associated with the first application instance;
  receiving an interaction request, from a second user working on a remote desktop client, at a remote input handler associated with the computing device and the first application instance;
  communicating, by the remote input handler, the interaction request to the current state component, which communicates the application data or data files that determine the application state associated with the first application instance to the remote input handler;
  in response to the interaction request, a remote output handler associated with the computing device and the first application instance renders the same first information display displayed to the first user on the computing device to the second user on the remote desktop client;
  in response to an input to interact with the first information display by the second user at the remote desktop client that is inconsistent with the state data of the first application instance, locally launching a second application instance at the remote desktop client for the second user, wherein the input by the second user that is inconsistent with the state data of the first application instance comprises user interaction with a graphical UI element in the first information display;
  wherein the second application instance has a second application state associated therewith, operating as the remote desktop client on a different computing device, wherein the second application instance is associated with an application launcher;
  receiving, at the application launcher, the application data or data files that determine the application state associated with the first application instance; and
  instantiating the second application instance and adjusting its application state so that the second instance, and
  processing the interaction request locally against the second application state;
  the second application instance converting the second application state into a visual output to be displayed on a second information display to the second user; and
  wherein the second application instance can be operated independently by the second user from the first application instance operated by the first user, including one or more subsequent interaction requests are processed locally against the second application state.

21. The system of claim 1 wherein the second application instance can thereafter be operated independently from, and occasionally synchronized with, the first application instance.

22. The system of claim 21 whereupon the second application instance being synchronized with the first application instance, the application state of the first or second application instance is replicated to that of the other application instance.

23. The system of claim 22 wherein the system further comprises a display device that further displays a desktop, and wherein each of the first and second application instances includes a user interface displayed on the desktop, and whereupon the application state of the first or second application instance being replicated to that of the other application instance, their user interfaces displayed on the desktop are synchronized.

24. The method of claim 11 wherein the second application instance can thereafter be operated independently from, and occasionally synchronized with, the first application instance.

25. The method of claim 24 whereupon the second application instance being synchronized with the first application instance, the application state of the first or second application instance is replicated to that of the other application instance.

26. The method of claim 25 further comprising providing a display device that displays a desktop, and wherein each of the first and second application instances includes a user interface displayed on the desktop, and whereupon the application state of the first or second application instance being replicated to that of the other application instance, their user interfaces displayed on the desktop are synchronized.

27. A system for enabling a collaborative remote desktop environment, comprising:
  a computing device having a processor;
  a first application instance, operating as a host by a first user, that has an application state associated therewith, the application state having application state data adequate to enable a another computing device or application instance to reach a substantially similar application state, and the first application instance converting the application state into a visual output to be displayed on a first information display to the first user;
  the first application instance is associated with
    an application input handler,
    an application logic component,
    an application output handler,
    and a current state component that collects one or more application data or data files that determine the application state associated with the first application instance;
  a remote input handler, associated with the computing device and the first application instance, that receives an interaction request from a second user working on a remote desktop client, and
communicates the interaction request to the current state component, which communicates the application data or data files that determine the application state associated with the first application instance to the remote input handler;
in response to the interaction request, a remote output handler associated with the computing device and the first application instance renders the same first information display displayed to the first user on the computing device to the second user on the remote desktop client;
in response to an input to interact with the first information display by the second user at the remote desktop client that is inconsistent with the state data of the first application instance, locally launching a second application instance at the remote desktop client for the second user, wherein the input by the second user that is inconsistent with the state data of the first application instance comprises user interaction with a graphical UI element in the first information display;
wherein the second application instance has a second application state associated therewith, operating as the remote desktop client on a different computing device, wherein the second application instance is associated with a second application state that is substantially identical to that of the first application state based on the application data or data files that determine the application state associated with the first application instance;
the second application instance converting the second application state into a visual output to be displayed on a second information display to the second user; and
wherein the second application instance can be
operated independently by the second user from the first application instance operated by the first user, including one or more subsequent interaction requests are processed locally against the second application state, and
occasionally synchronized with the first application instance, whereupon the synchronization the application state of the first or second application instance is replicated to that of the other application instance.

28. A system for enabling a collaborative shared desktop environment, comprising:
a computing device having a processor;
a first application instance executing on the processor, operating as a host by a first user, that has an application state associated therewith, the application state having application state data adequate to enable a another computing device or application instance to reach a substantially similar application state, and the first application instance converting the application state into a visual output to be displayed on a first information display to the first user;
the first application instance is associated with
an application input handler,
an application logic component,
an application output handler, and
a current state component that collects one or more application data or data files that determine the application state associated with the first application instance;
a remote input handler, associated with the computing device and the first application instance, that
receives an interaction request from a second user working on a shared desktop client, and
communicates the interaction request to the current state component, which communicates the application data or data files that determine the application state associated with the first application instance to the remote input handler;
in response to the interaction request, a remote output handler associated with the computing device and the first application instance renders the same first information display displayed to the first user on the computing device to the second user on the shared desktop client;
in response to an input to interact with the first information display by the second user at the shared desktop client that is inconsistent with the state data of the first application instance, locally launching a second application instance at the shared desktop client for the second user, wherein the input by the second user that is inconsistent with the state data of the first application instance comprises user interaction with a graphical UI element in the first information display;
wherein the second application instance operating as the shared desktop client on the computing device that has a second application state associated therewith, wherein the second application instance is
associated with an application launcher that
receives the application data or data files that determine the application state associated with the first application instance,
instantiates the second application instance and adjusts the second application state
so that the second application state is substantially identical to that of the first application state, and
processes the interaction request locally against the second application state;
the second application instance converting the second application state into a visual output to be displayed on a second information display to the second user; and
wherein the second application instance can be operated by the second user independently from the first application instance operated by the first user, including one or more subsequent interaction requests are processed locally against the second application state.

\* \* \* \* \*